US011918005B1

(12) United States Patent
Chawla et al.

(10) Patent No.: US 11,918,005 B1
(45) Date of Patent: Mar. 5, 2024

(54) DAIRY-BASED ZERO SUGAR FOOD PRODUCT AND ASSOCIATED METHOD

(71) Applicant: Chobani LLC, Norwich, NY (US)

(72) Inventors: Amrish Chawla, Twin Falls, ID (US);
Sarah Allred, Twin Falls, ID (US);
Zeina Jouni, Twin Falls, ID (US);
Ragavendra Hari, Twin Falls, ID (US);
Yucheng Hu, Twin Falls, ID (US)

(73) Assignee: Chobani LLC, New York, NY (US)

( * ) Notice: Subject to any disclaimer, the term of this patent is extended or adjusted under 35 U.S.C. 154(b) by 172 days.

(21) Appl. No.: 17/223,197

(22) Filed: Apr. 6, 2021

(51) Int. Cl.
A23C 9/142 (2006.01)
A23C 3/02 (2006.01)
A23C 9/12 (2006.01)
A23C 9/123 (2006.01)
A23C 9/127 (2006.01)
A23C 9/13 (2006.01)

(52) U.S. Cl.
CPC .............. *A23C 9/1422* (2013.01); *A23C 3/02* (2013.01); *A23C 9/1206* (2013.01); *A23C 9/1209* (2013.01); *A23C 9/1213* (2013.01); *A23C 9/1216* (2013.01); *A23C 9/1234* (2013.01); *A23C 9/1238* (2013.01); *A23C 9/1275* (2013.01); *A23C 9/1307* (2013.01); *A23C 9/1315* (2013.01); *A23C 2210/202* (2013.01); *A23C 2210/252* (2013.01); *A23C 2210/254* (2013.01)

(58) Field of Classification Search
CPC ....... A23C 9/1422; A23C 3/02; A23C 9/1206; A23C 9/1209; A23C 9/1213; A23C 9/1216; A23C 9/1234; A23C 9/1238; A23C 9/1275; A23C 9/1307; A23C 9/1315; A23C 2210/202; A23C 2210/252; A23C 2210/254
USPC ................. 426/43, 34, 40, 42, 580
See application file for complete search history.

(56) References Cited

U.S. PATENT DOCUMENTS

| | | | |
|---|---|---|---|
| 3,930,028 A * | 12/1975 | Ullmann | A23K 10/12 |
| | | | 435/207 |
| 6,881,428 B2 | 4/2005 | Lange | |
| 7,169,428 B2 | 1/2007 | Dunker et al. | |
| 7,829,130 B2 | 11/2010 | Tossavainen et al. | |
| 7,947,315 B2 | 5/2011 | Kodera et al. | |
| 8,445,052 B2 | 5/2013 | Holst et al. | |
| 8,449,938 B2 | 5/2013 | Tossavainen et al. | |
| 9,167,824 B2 | 10/2015 | Carrigan et al. | |
| 9,185,921 B2 | 11/2015 | Jacobsen et al. | |
| 9,510,606 B2 | 12/2016 | Ur-Rehman et al. | |
| 9,538,770 B2 | 1/2017 | Ur-Rehman et al. | |
| 9,888,699 B2 | 2/2018 | Myllarinen et al. | |
| 9,974,318 B2 | 5/2018 | Katase et al. | |
| 10,098,367 B2 | 10/2018 | Jacobsen et al. | |
| 10,390,542 B2 | 8/2019 | Dunker et al. | |
| 10,455,845 B2 | 10/2019 | Ur-Rehman et al. | |
| 10,455,846 B2 | 10/2019 | Ur-Rehman et al. | |
| 10,595,541 B2 | 3/2020 | Ur-Rehman et al. | |
| 10,631,551 B2 | 4/2020 | Puigferrat et al. | |
| 10,645,954 B2 | 5/2020 | Browne et al. | |
| 10,743,556 B2 | 8/2020 | Puigferrat et al. | |
| 2004/0151802 A1* | 8/2004 | Koka | A23C 13/165 |
| | | | 426/39 |
| 2005/0170044 A1 | 8/2005 | Lange | |
| 2007/0098871 A1 | 5/2007 | Dunker et al. | |
| 2007/0166447 A1 | 7/2007 | Ur-Rehman et al. | |
| 2010/0297294 A1 | 11/2010 | Ur-Rehman et al. | |
| 2012/0021093 A1 | 1/2012 | Qvist et al. | |
| 2012/0040053 A1 | 2/2012 | Rasholt et al. | |
| 2012/0045546 A1 | 2/2012 | Faergemand et al. | |
| 2013/0230632 A1 | 9/2013 | Holst et al. | |
| 2013/0266691 A1 | 10/2013 | Horiuchi | |
| 2014/0017332 A1 | 1/2014 | Tikanmaki et al. | |
| 2014/0113043 A1 | 4/2014 | Ur-Rehman et al. | |
| 2014/0170266 A1 | 6/2014 | Siemensma et al. | |
| 2014/0227393 A1 | 8/2014 | Chen et al. | |
| 2014/0335256 A1 | 11/2014 | McKillop | |
| 2015/0030722 A1 | 1/2015 | Qvist et al. | |
| 2015/0230484 A1 | 8/2015 | Doring | |
| 2015/0320061 A1 | 11/2015 | Warin et al. | |
| 2015/0342208 A1 | 12/2015 | Bunce et al. | |
| 2016/0058024 A1* | 3/2016 | Sundgren | A23C 9/1213 |
| | | | 426/580 |
| 2016/0106118 A1 | 4/2016 | Carrigan et al. | |
| 2017/0006889 A1 | 1/2017 | Ishimori et al. | |
| 2017/0127698 A1 | 5/2017 | Young et al. | |
| 2017/0202232 A1 | 7/2017 | Kontkanen et al. | |

(Continued)

FOREIGN PATENT DOCUMENTS

| | | | |
|---|---|---|---|
| WO | 2017174752 A1 | 10/2017 | |
| WO | 2018117911 A1 | 6/2018 | |

(Continued)

*Primary Examiner* — Leslie A Wong

(74) *Attorney, Agent, or Firm* — Wood Herron & Evans LLP

(57) ABSTRACT

Methods of making a zero sugar dairy-based food product and a zero sugar dairy-based food product are provided. The dairy-based food product includes a protease, an acyl transferase, a lactase, a skim milk, at least one of an additional ingredient selected from a group consisting of a probiotic, an artificial flavoring, a natural flavoring, a cream, a vitamin, a pectin, an oil, and combinations thereof, and an amount of water. The dairy-based food product further includes a sugar content of between 0 wt % and 0.4 wt %.

7 Claims, 4 Drawing Sheets

(56) References Cited

U.S. PATENT DOCUMENTS

| | | |
|---|---|---|
| 2017/0367360 A1 | 12/2017 | Yu et al. |
| 2018/0042253 A1 | 2/2018 | Eisele et al. |
| 2018/0070604 A1 | 3/2018 | Carrigan et al. |
| 2018/0133292 A1 | 5/2018 | Inui |
| 2018/0199585 A1 | 7/2018 | Qvist et al. |
| 2018/0228175 A1 | 8/2018 | Ur-Rehman et al. |
| 2018/0242608 A1 | 8/2018 | Tikanmaki et al. |
| 2018/0289029 A1 | 10/2018 | De La Cruz et al. |
| 2018/0295847 A1 | 10/2018 | De La Cruz et al. |
| 2019/0008176 A1 | 1/2019 | Bilbao Calabuig et al. |
| 2019/0045805 A1 | 2/2019 | Ur-Rehman et al. |
| 2019/0082706 A1 | 3/2019 | Garault et al. |
| 2019/0090500 A1 | 3/2019 | Chen et al. |
| 2019/0387762 A1 | 12/2019 | Fultz et al. |
| 2020/0008438 A1 | 1/2020 | Ur-Rehman et al. |
| 2020/0120947 A1 | 4/2020 | McCormick et al. |
| 2020/0178550 A1 | 6/2020 | Holst et al. |
| 2020/0288736 A1 | 9/2020 | Fischer et al. |

FOREIGN PATENT DOCUMENTS

| | | |
|---|---|---|
| WO | 2018152054 A1 | 8/2018 |
| WO | 2018192830 A1 | 10/2018 |
| WO | 2019032365 A1 | 2/2019 |
| WO | 2019065651 A1 | 4/2019 |
| WO | 2019212704 A1 | 11/2019 |
| WO | 2020009804 A1 | 1/2020 |
| WO | 2020079270 A1 | 4/2020 |
| WO | 2020117548 A1 | 6/2020 |
| WO | 2020128082 A1 | 6/2020 |
| WO | 2020176734 A1 | 9/2020 |

\* cited by examiner

DAIRY-BASED ZERO SUGAR FOOD PRODUCT AND ASSOCIATED METHOD

TECHNICAL FIELD

This application relates to food products and methods and, in particular, relates to dairy-based food products having zero sugar content and methods of manufacturing dairy-based food products having zero sugar content.

BACKGROUND

In the manufacture of food products, reducing the sugar content of food products has been an increasingly appealing field of development based on the consumer marketplace and its demands. Consumer food choice decisions often turn on the sugar content in food for a variety of reasons. Popular diets, diabetic consumers, and/or other reasons have driven consumers to search for food products having lower sugar content than their predecessors. Consumption of high-sugar food products have been shown to increase a consumer's risk of developing diabetes, weight gain, and other negative health consequences. It is therefore desirable for food product manufacturers to offer alternatives and further developments for food products so as to provide a lower sugar content as an option.

Dairy-based food products have historically needed to add sugar/carbohydrates to assist in improving flavoring, color, and desirability of consuming these dairy-based food products. While the consumption of dairy-based food products provides a significant source of many nutrients found in the dairy bases of dairy-based food products, as mentioned above, the addition of sugar can be detrimental to the health of the consumer and many consumers are choosing food options with reduced or zero sugar. As a result, many consumers that would otherwise be interested in dairy-based food products are left with no good options in the current food product marketplace based on typical levels of sugar content in such conventional products.

Accordingly, it would be desirable to produce dairy-based food products having reduced or little-to-no sugar in the final product. Of course, maintaining previously-made improvements in flavoring, color, and desirability of such food products is also an objective when making alternatives with lower sugar content.

SUMMARY

To address these and other technical problems within the conventional art, a dairy-based food product with zero sugar is provided in accordance with one embodiment. The food product includes an amount of water, a sugar content of between 0 wt % and 0.4 wt %, and a protease, an acyl transferase, a lactase, an additional ingredient selected from a group consisting of a probiotic, an artificial flavoring, a natural flavoring, a cream, a vitamin, a pectin, an oil, and combinations thereof, and a skim milk. This combination of elements making up the dairy-based food product allows for various types of food products including dairy-based shakes, yogurts, shakes, bars, and the like with desirable flavor and coloring at least similar to conventional products with high sugar content, while substantially eliminating all sugar content from the food product. As such, the dairy-based food product of this and other embodiments improves the field by providing more consumer options for such types of food products without the usual downside of a high sugar content.

A method of making a zero sugar dairy-based food product is provided. The method includes adding an enzyme blend including a lactose oxidase and a beta galactosidase to an amount of raw milk to form an amount of enzyme treated milk. The method further includes separating the enzyme treated milk into a skim portion and a cream portion. The method further includes pasteurizing the skim portion to form a pasteurized skim portion. The method further includes adding water to the pasteurized skim portion to form a pasteurized skim portion with added water. The method further includes filtering the pasteurized skim portion with added water by ultrafiltration forming a permeate portion and a retentate portion. The method further includes adding an additional ingredient selected from a group consisting of a probiotic, an artificial flavoring, a natural flavoring, an amount of the cream portion, a vitamin, a pectin, an oil, and combinations thereof, to the retentate portion forming a retentate portion with added ingredients. The method further includes heating the retentate portion with added ingredients to a temperature between 285° F. and 295° F. for a preselected amount of time forming the zero sugar dairy-based food product. The dairy-based food product formed by this method has a sugar content of between 0 wt % and 0.4 wt %.

In another embodiment according to the invention, the skim portion includes between 2.5 wt % and 3.5 wt % lactose.

In another embodiment according to the invention, the retentate includes carbohydrates between 0.35 wt % and 0.45 wt % of the retentate.

In another embodiment according to the invention, the preselected amount of time is between 3 seconds and 10 seconds.

In another embodiment according to the invention, the method further includes pasteurizing the cream portion.

In another embodiment according to the invention, the ultrafiltered retentate comprises lactose in an amount between 0.7 wt % and 1.3 wt %.

In another embodiment according to the invention, the method further includes adding bacterial cultures to the retentate and fermenting the retentate.

Another method of making a zero sugar diary-based food product is provided. The method includes pasteurizing an amount of raw milk to form pasteurized milk. The method further includes separating the pasteurized milk into a skim portion and a cream portion. The method further includes filtering the skim portion by ultrafiltration to form a permeate and a retentate. The method further includes adding a portion of the permeate, an acyl transferase, and a blend to the cream potion to form a mixture, wherein the blend comprises a lactic acid bacteria, a yogurt starter culture, and probiotics. The method further includes maturing the mixture for at least 8 hours to form the zero sugar diary-based food product. The dairy-based food product formed by this method has a sugar content of between 0 wt % and 0.4 wt %.

In another embodiment according to the invention, the cream portion includes fat between 55 wt % and 65 wt % of the cream portion.

In another embodiment according to the invention, maturing the mixture further includes heating the mixture to 104° F.

In another embodiment according to the invention, the yogurt starter culture includes *Streptococcus thermophilus* and *Lactobacillus bulgaricus*.

In another embodiment according to the invention, the probiotics include a *Bifidobacterium* species, a *Lactobacil-*

*lus rhamnosus* species, a *Lactobacillus casei* species, and a *Lactobacillus helveticus* species.

In another embodiment according to the invention, the method further includes fermenting the mixture.

In another embodiment according to the invention, fermenting the mixture includes fermenting the mixture at a temperature of between 104° F. and 107.6° F.

In another embodiment according to the invention, fermenting the mixture includes fermenting the mixture for between 10 hours and 16 hours.

A zero sugar diary-based food product is provided. The dairy-based food product includes a protease, an acyl transferase, a lactase, a skim milk, at least one of an additional ingredient selected from a group consisting of a probiotic, an artificial flavoring, a natural flavoring, a cream, a vitamin, a pectin, an oil, and combinations thereof, and an amount of water. The dairy-based food product further includes a sugar content of between 0 wt % and 0.4 wt %.

In another embodiment according to the invention, the dairy-based food product includes the protease in an amount of between 0.00015 wt % and 0.0003 wt % of the dairy-based food product, the acyl transferase in an amount of between 0.001 wt % and 0.002 wt % of the dairy-based food product, the lactase in an amount of between 0.2 wt % and 0.4 wt % of the dairy-based food product, the skim milk in an amount of between 57 wt % and 62 wt % of the dairy-based food product, the oil in an amount of between 1.2 wt % and 2 wt % of the dairy-based food product, the cream in an amount of between 0.4 wt % and 0.8 wt % of the dairy-based food product, the natural flavoring in an amount of between 28 wt % and 32 wt % of the dairy-based food product, the pectin in an amount of between 0.12 wt % and 0.18 wt % of the dairy-based food product, and the water in an amount of between 6 wt % and 8 wt % of the dairy-based food product.

In another embodiment according to the invention, the skim milk includes a protein in an amount of between 7.5 wt % and 12.5 wt % of the skim milk.

Another method of making a zero sugar diary-based food product is provided. The method includes adding a first amount of enzymes to a mixture of cream and water to form an enzyme mixture, wherein the cream includes fat in an amount between 30 wt % and 40 wt % of the cream, and the water is present in the mixture in a 50:50 weight ratio of water to fat. The method further includes pasteurizing the enzyme mixture. The method further includes separating the enzyme mixture into a cream portion and a skim portion, wherein the cream portion includes fat in an amount of about 55 wt % and 65 wt % of the cream portion. The method further includes filtering the skim portion by ultrafiltration to form a permeate and a retentate. The method further includes adding a second amount of the enzymes to the permeate to form a permeate with enzymes. The method further includes mixing the permeate with enzymes and the cream portion to form a zero sugar cream blend. The method further includes adding a protease and additional ingredients to the zero sugar cream blend to form the zero sugar dairy-based food product, the additional ingredients selected from a group consisting of probiotics, natural flavoring, artificial flavoring, vitamins, pectin, oil, and combinations thereof. The method further includes heating the zero sugar cream blend to a temperature of between 285° F. and 295° F. for between 3 seconds and 10 seconds to form the dairy-based food product. The dairy-based food product formed by this method has a sugar content of between 0 wt % and 0.4 wt %.

In an embodiment according to the invention, the zero sugar cream blend has a pH of between 6.5 and 7.1.

BRIEF DESCRIPTION OF THE DRAWINGS

Further features, advantages and possible applications of the present invention will be apparent from the following description in connection with the figures, in which the same reference signs are used throughout for the same or mutually corresponding elements of the invention. The accompanying drawings, which are incorporated in and constitute a part of this specification, illustrate one or more embodiments of the invention and, together with the general description given above and the detailed description given below, explain the one or more embodiments of the invention.

DETAILED DESCRIPTION

According to embodiments of the invention summarized herein, the methods form a dairy-based food product. The methods described herein removes essentially all sugars from the dairy-based materials resulting in a dairy-based food product having zero sugar content ("zero sugar" being as defined herein). All ranges of parameters described herein include the endpoints.

As used herein, the terms "zero sugar", "sugar free", and free of "essentially all sugars" indicates that the product complies with FDA Regulations stating that "zero sugar" means the food must be less than 0.5 g sugar per labelled serving (i.e., 5.3 oz/150 g) and per 6 oz/170 g (the RACC or serving size for yogurt). Accordingly, food products described herein as "zero sugar", "sugar free", or free of "essentially all sugar", have, at most 0.5 g sugar per 5.3 oz or 150 g of food product or, in the case of a yogurt, 0.5 g sugar per labelled serving of 6 oz or 170 g of yogurt. In addition, food products described herein as "zero sugar", "sugar free", or free of "essentially all sugar", include a sugar content in an amount of between 0 wt % and 0.4 wt % of the food product.

Figure 1:
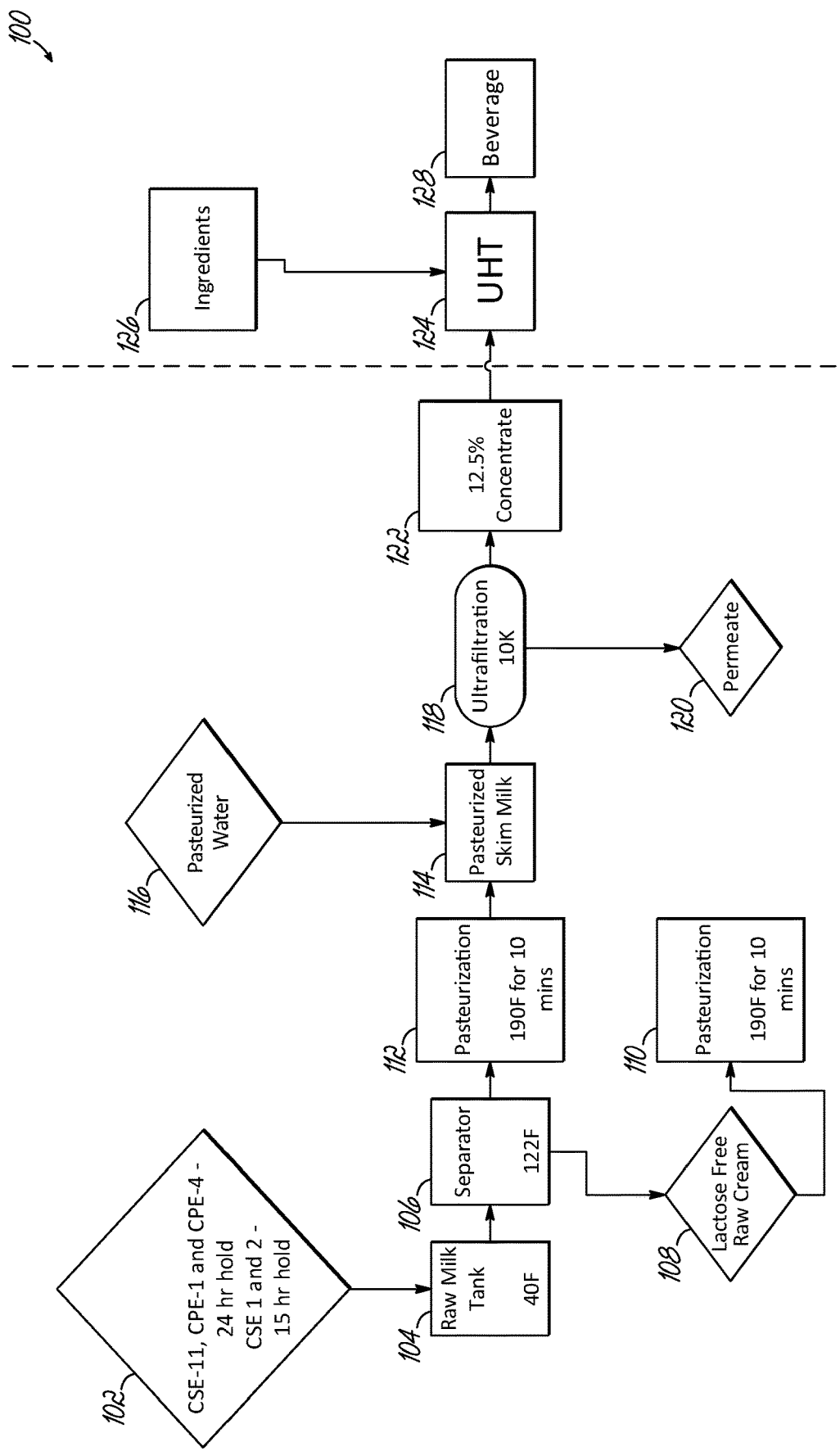
FIG. 1 shows a flow chart for a method of manufacturing a dairy-based food product.

Referring to FIG. 1, the flowchart shown in FIG. 1 is a method 100 of manufacturing a dairy-based food product, for example a dairy-based shake. The method includes, in step 102, mixing enzymes to form a first enzyme blend. The enzymes included in the first enzyme blends include a sugar enzyme (CSE-11) of lactase (Beta galactosidase), and two protein enzymes including CPE-1 and CPE-4. CPE-1 is a protein enzyme including a protease enzyme, which in one example is manufactured by Koninklijke DSM N.V. (Royal DSM, referred to herein as DSM) located in Heerlen, Netherlands under the product name MaxiPro CPP. CPE-4 is a protein enzyme including an acyl transferase, which in one example is manufactured by Ajinomoto Co., Inc. located in Chuo City, Tokyo, Japan. CPE-4 is manufactured under the product name TI. The CSE-11 helps hydrolyze lactose and polymerize galactooligosaccharide fiber in milk. In an embodiment, the CSE-11 enzyme is Saphera® 46115, manufactured by Novozymes located in Bagsvaerd, Denmark. The first enzyme blend is held and/or mixed for a period of time, in some examples for 24 hours.

After the first enzyme blend is held and/or mixed for the period of time, two more enzymes are added to the first enzyme blend, also in step 102. The two additional enzymes are sugar enzymes CSE-1 and CSE-2. CSE-1 and CSE-2 are enzymes that hydrolyze carbohydrates in a milk material feed. CSE-1 includes a lactose oxidase configured to convert lactose in a raw milk feed to lactobionic acid (LBA). In an example, CSE-1 includes a lactose oxidase manufactured by Chr. Hansen, a company headquartered in HORSHOLM, Denmark, referred to herein as Chr. Hansen, under the tradename LactoYIELD®. As a charged molecule, LBA may be more easily removed than lactose from whey products such as galacto-oligosaccharides, resulting in increased purity and higher whey value. The addition of the two additional enzymes to the first enzyme blend form a second enzyme blend, and the second enzyme blend is held and/or mixed for a period of time. In some examples, the period of time the second enzyme blend is held and/or mixed for about 15 hours.

In step 104, the second enzyme blend is added to a raw milk tank containing a raw milk material feed. The raw milk material feed may include mammalian milk or other dairy-based milk. The temperature of the mixture of the raw milk material feed and the second enzyme blend in the raw milk tank is set to a temperature, which, in some examples, is about 40° F.

In step 106, the mixture in the raw milk tank is fed into a separator. In the separator, the mixture is separated into a cream portion, in step 108, and a skim portion, to be pasteurized in step 112. The separator can be a centrifugal separator and/or a clarifying separator. At some point prior or during separation of the cream portion and the skim portion, the second enzyme blend hydrolyzes carbohydrates and proteins in the raw milk feed material. For example, the cream portion and/or the skim portion may be lactose reduced at least because the enzymes included in the second enzyme blend hydrolyze lactose into glucose and galactose, for example. The lactose content of the skim portion can be within 3 wt % and 4 wt %. Furthermore, carbohydrates included in the raw milk material feed or formed after the raw milk material feed is exposed to the second enzyme blend may be consumed by the enzymes included in the second enzyme blend.

In step 110, the cream portion is pasteurized to destroy pathogens that may be included in the cream portion. The pasteurization process includes heating the cream portion to at or above about 190° F. for an amount of time, in some examples, for 10 minutes.

In step 112, the skim portion is fed into a pasteurization tank. The skim portion includes a lactose content of within 2.5-3.5 wt %. The skim portion is separately pasteurized from the cream portion to destroy pathogens that may be included in the skim portion. The pasteurization process includes heating the skim portion to at or above about 190° F. for an amount of time, in some examples, for 10 minutes.

In step 116, the pasturized water is then added to the pasteurized skim portion, in step 114, as part of a diafiltration process. The water is potable water or membrane filtered and pasturized. The amount of water added results in a ratio of skim portion to water of about 70:30 by weight. The water assists in absorbing water-soluble compounds present in the skim portion such as sugars, enzyme reaction products, and enzyme reaction biproducts into a liquid phase. This absorption scheme facilitates further separation by ultrafiltration in the process. For example, at least because water-soluble compounds are in the liquid phase, removal of undesirable compounds, such as sugar, in the ultrafiltration permeate, while simultaneously concentrating desired compounds in the ultrafiltration retentate.

In step 118, the pasteurized skim portion with added water is subjected to ultrafiltration. The ultrafiltration includes membranes that separate the pasteurized skim portion with added water into a permeate portion, in step 120, and a retentate portion, in step 122. The permeate portion, in step 120, is separated from the retentate portion, in step 122, and the retentate portion is used in further processing. The retentate includes a concentrated amount of protein, which in some examples is about 12.5 wt % protein. The ultrafiltration filters material having a molecular weight cut off of about 10,000 Daltons. The sugar percentage of the ultrafiltered retentate can be within 0.35-0.45 wt %.

In step 126, additional ingredients are added to the ultrafiltered retentate. The additional ingredients may include flavorings (artificial or natural), probiotics, oils such as medium chain triglyceride (MCT) oil which contain two or three fatty acids, canola oil, and mixtures thereof, gellan gum, and vitamins such as Vitamin A, Vitamin D, Vitamin E, Vitamin K, Vitamin C and Vitamin B1, B2, B3, B5, B6, B7, B9, B12, and mixtures thereof. In some examples, the MCT oil includes triglycerides having one or more carbon chains including between 3 and 13 carbon atoms.

In step 124, the ultrafiltered retentate along with the added ingredients is subjected to an ultra-high temperature process. The temperature of the ultrafiltered retentate along with the added ingredients is increased to between about 285° F. and 295° F. for 3-10 seconds. After the ultrafiltered retentate along with the added ingredients is treated to the ultra-high temperature process, the dairy-based shake is formed in step 128. Particularly, the dairy-based shake has significantly low amounts of sugar, and in some examples, the amount of sugar content of the dairy-based shake is between 0 wt % and 0.4 wt %.

Figure 2:
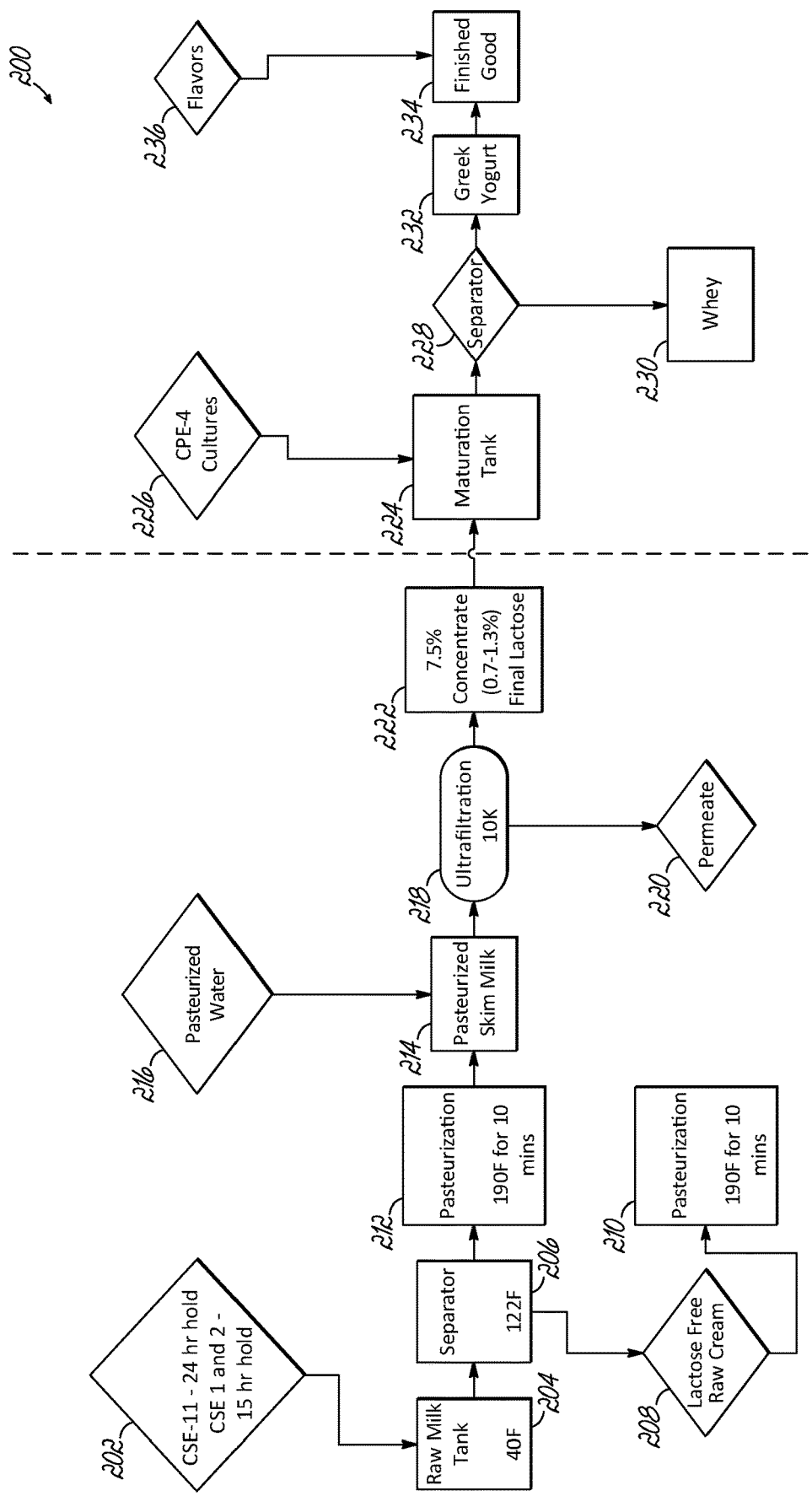
FIG. 2 shows a flow chart for a method of manufacturing a dairy-based food product.

Referring to FIG. 2, the flowchart shown in FIG. 2 is a method 200 of manufacturing a dairy-based food product, for example a dairy-based yogurt. The method includes, in step 202, mixing enzymes to form a first enzyme blend. The enzymes included in the first enzyme blends include a sugar enzyme (CSE-11) of lactase (Beta galactosidase). The CSE-11 helps hydrolyze lactose and polymerize galactooligosaccharide fiber in milk. In an embodiment, the CSE-11 enzyme is Saphera® 46115, manufactured by Novozymes located in Bagsvaerd, Denmark. The first enzyme blend is held and/or mixed for a period of time, in some examples for 24 hours.

After the first enzyme blend is held and/or mixed for the period of time, also in step 202, two more enzymes are added to the first enzyme blend. The two additional enzymes are sugar enzymes CSE-1 and CSE-2. CSE-1 and CSE-2 are enzymes that hydrolyze carbohydrates in a milk material feed. The addition of the two additional enzymes to the first enzyme blend form a second enzyme blend, and the second enzyme blend is held and/or mixed for a period of time. In some examples, the period of time the second enzyme blend is held and/or mixed for about 15 hours.

In step 204, the second enzyme blend is added to a raw milk tank containing a raw milk material feed. The raw milk material feed may include mammalian milk or other dairy-based milk. The temperature of the mixture of the raw milk material feed and the second enzyme blend in the raw milk tank is set to a temperature, which, in some examples, is about 40° F.

In step 206, the mixture in the raw milk tank is fed into a separator. In the separator, the mixture is separated into a cream portion, shown in step 208, and a skim portion, shown in step 212. The separator can be a centrifugal separator and/or a clarifying separator. At some point prior or during separation of the cream portion, shown in step 208, and the skim portion, shown in step 212, the second enzyme blend hydrolyzes sugars and proteins in the raw milk feed material. For example, the cream portion and/or the skim portion may be lactose reduced at least because the enzymes included in the second enzyme blend hydrolyze lactose into glucose and galactose, for example. The lactose content of the skim portion can be within 3 wt % and 4 wt %. Furthermore, sugars included in the raw milk material feed or formed after the raw milk material feed is exposed to the second enzyme blend may be consumed by the enzymes included in the second enzyme blend.

In step 210, the cream portion is pasteurized to destroy pathogens that may be included in the cream portion. The pasteurization process includes heating the cream portion to at or above about 190° F. for an amount of time, in some examples, for 10 minutes.

In step 212, the skim portion includes a lactose content of within 2.5-3.5 wt %. The skim portion is separately pasteurized from the cream portion to destroy pathogens that may be included in the skim portion. The pasteurization process includes heating the skim portion to at or above about 190° F. for an amount of time, in some examples, for 10 minutes.

In step 216, the water is added to the pasteurized skim portion as part of a diafiltration process. The water is potable water or membrane filtered and pasteurized The amount of water added results in a ratio of skim portion to water of about 70:30 by weight. The water assists in absorbing water-soluble compounds present in the skim portion such as sugars, enzyme reaction products, and enzyme reaction biproducts into a liquid phase. This absorption scheme facilitates further separation by ultrafiltration in the process, and is shown in step 214. For example, at least because water-soluble compounds are in the liquid phase, removal of undesirable compounds, such as sugar, in the ultrafiltration permeate, while simultaneously concentrating desired compounds in the ultrafiltration retentate.

In step 218, the pasteurized skim portion with added water is subjected to ultrafiltration. The ultrafiltration includes membranes that separate the pasteurized skim portion with added water into a permeate portion, in step 220, and a retentate portion, in step 222. The permeate portion, shown in step 220, is separated from the retentate portion in step 222, and the retentate portion is used in further processing. The retentate portion includes a concentrated amount of protein, which in some examples is about 7.5 wt % protein. The ultrafiltration filters material having a molecular weight cut off of about 10,000 Daltons. The lactose percentage of the ultrafiltered retentate can be within 0.7-1.3 wt %.

In step 226, a protein enzyme (CPE-4) and bacterial cultures are added to the ultrafiltered retentate, and the mixture ferments in a maturation tank, in step 224. CPE-4 is a protein enzyme including an acyl transferase, which in one example is manufactured by Ajinomoto Co., Inc. located in Chuo City, Tokyo, Japan. CPE-4 is manufactured under the product name TI. The bacterial cultures include varieties of lactic acid bacteria, yogurt starter cultures (*S. thermophilus, L. bulgaricus*) and probiotics that give the dairy yogurt product unique texture, separation capability, probiotics, and sensory features. The CPE-4 together with the bacterial cultures are referred to herein as Milk 2.0. In addition, other bacterial cultures, for example, bacterial cultures that are probiotics in humans, may be added to the mixture. These probiotics may include CZC-1, CPC-1, and CPC-2, which include Bifido sp. *L. rhamnosus* sp. *L. casei* sp. *L. helveticus* sp., respectively. In an embodiment, CZC-1 is manufactured by Koninklijke DSM N.V. (Royal DSM, referred to herein as DSM) located in Heerlen, Netherlands under the tradename TD-MN. CZC-1 is a *L. helveticus* with highly functional galKTM operon that helps CZC-1 consume galactose more favorably than glucose or lactose. The bacterial cultures includes homo and heterofermentative lactic acid bacteria which ferment the carbohydrates in Milk 2.0 thereby reducing the sugar content of the mixture to a low amount. The particular bacterial cultures used to ferment the carbohydrates in Milk 2.0 are particularly effective, as other lactic acid bacteria prefer to consume glucose and lactose more preferably. CPC-1 is a *L. casei* probiotic having a higher preference to consume galactose than other bacterial cultures. In an embodiment, CPC-1 is an *L. casei* manufactured by Chr. Hansen, under the tradename *L. casei* 431®. CPC-2 is a *L. rhamnosus* probiotic. In some examples, the CPC-2 is *L. rhamnosus* LGG®, manufactured by Chr. Hansen. In FIG. 2, CPC-1 and CPC-2 are referred to as CCE-2 and CCE-3, respectively. The mixture ferments in the maturation tank for between about 10 hours and 16 hours at between about 104° F. and 107.6° F.

As used herein, Milk 2.0 refers to a combination of enzymes, probiotics, bacterial cultures, and bioprotectant cultures. In an embodiment, Milk 2.0 includes CPE-4 in an amount of between 0.00087 wt % and 0.00093 wt % of Milk 2.0, with a preferred amount of CPE-4 being 0.0009 wt % of Milk 2.0. In addition, Milk 2.0 includes Mild 2.0 in an amount between 0.001 wt % and 0.0016 wt % of Milk 2.0, with a preferred amount of Mild 2.0 being 0.0013 wt % of Milk 2.0. In addition, Milk 2.0 includes CZC-1 in an amount between 0.0025 wt % and 0.003 wt %, with a preferred amount of CZC-1 being 0.0027 wt % of Milk 2.0. In addition, Milk 2.0 includes *L. casei* 431® in an amount between 0.0027 wt % and 0.0033 wt %, with a preferred amount of *L. casei* 431® being 0.003 wt % of Milk 2.0. In addition, Milk 2.0 includes *L. rhamnosus* LGG® in an amount between 0.00097 wt % and 0.0013 wt %, with a preferred amount of *L. rhamnosus* LGG® being 0.001 wt % of Milk 2.0. In addition, Milk 2.0 includes Nu-trish a/B® in an amount of between 0.0037 wt % and 0.0043 wt %, with a preferred amount of Nu-trish a/B® being 0.004 wt % of Milk 2.0. In addition, Milk 2.0 includes FreshQ 3® in an amount of between 0.0037 wt % and 0.0033 wt %, with a preferred amount of Fresh Q3® being 0.003 wt % of Milk 2.0.

Mild 2.0 refers to a bacterial culture used in Milk 2.0. Mild 2.0 is composed of a mixture of *Streptococcus thermophilus* and *Lactobacilus delbrueckii* subsp. *Bulgaricus*. These cultures were particularly selected for inclusion in Mild 2.0 for their natural ability to make Greek Style yogurt. The *Streptococcus thermophilus* is present in Mild 2.0 in an amount of between about 90 wt % and 99 wt % of the Mild 2.0 and the *Lactobacilus delbrueckii* subsp. *Bulgaricus* is present in Mild 2.0 in amount of between about 1 wt % and 10 wt % of the Mild 2.0. In a preferred embodiment, the *Streptococcus thermophilus* is present in the Mild 2.0 in an amount of 94 wt % of the Mild 2.0 and the *Lactobacilus delbrueckii* subsp. *Bulgaricus* is present in the Mild 2.0 in an amount of about 6 wt % of the Mild 2.0. Mild 2.0 may be manufactured by Chr. Hansen.

Nu-trish a/B® refers to a probiotic culture used in Milk 2.0. Nu-trish a/B® is composed of a mixture of *Bifidobacterium animalis* subsp. *Lactis* and *Lactobacillus acidophilus*. These cultures were particularly selected for their probiotic benefits in humans. The *Bifidobacterium animalis* subsp. *Lactis* is present in the Nu-trish a/B® in an amount of between about 60 wt % and 70 wt % of the Nu-trish a/B®. In a preferred embodiment, the *Bifidobacterium animalis* subsp. *Lactis* is present in an amount of about 65 wt % of the Nu-trish a/B®. The *Lactobacillus acidophilus* is present in the Nu-trish a/B® in an amount of between about 30 wt % and 40 wt % of the Nu-trish a/B®. In a preferred embodiment, the *Lactobacillus acidophilus* is present in the Nu-trish a/B® in an amount of about 35 wt % of the Nu-trish a/B®. Nu-trish a/B® may be manufactured by Chr. Hansen.

FreshQ 3® refers to a bioprotectant culture used in Milk 2.0. FreshQ 3® is composed of a mixture of *Lactobacillus paracasei* and *Lactobacillus rhamnosus*. These cultures were particularly selected for their natural ability to inhibit yeast and molds in fermented products. The *Lactobacillus paracasei* is present in the FreshQ 3® in an amount of between about 40 wt % and 50 wt % of the FreshQ 3®. In a preferred embodiment, the *Lactobacillus paracasei* is present in the FreshQ 3® is an amount of about 45 wt %. The *Lactobacillus rhamnosus* is present in the FreshQ 3® In an amount of between about 50 wt % and 60 wt % of the FreshQ 3®. In a preferred embodiment, the *Lactobacillus rhamnosus* is present in the FreshQ 3® in an amount of about 55 wt % of the FreshQ 3®. FreshQ 3® may be manufactured by Chr. Hansen.

In step 228, the fermented mixture is fed into a separator to separate the whey, shown in step 230, from the Greek yogurt, shown in step 232, included in the fermented mixture. The separator may be a centrifugal separator, a plate and frame ultrafiltration separator, a rotary yoghurt decanter, or other suitable separator apparatus. Alternatively, or in addition, the separator may include filters that filters the whey from the Greek yogurt included in the fermented mixture.

In step 236, additional ingredients are added to the Greek yogurt. The additional ingredients may include probiotics, flavorings (natural or artificial), fruit prep, an amount of the previously pasteurized cream portion, vitamins, and additional enzymes. The fruit prep includes water, inulin, natural flavors, pectin, vegetable juice, locust bean gum, monk fruit extract, lemon juice concentrate, calcium lactate, steviol glycosides, and sodium lactate.

In step 234, after the additional ingredients are added to the fermented mixture, a dairy-based yogurt is formed. Particularly, the dairy-based yogurt has significantly low amounts of carbohydrates, and in some examples, the amount of carbohydrates in the dairy-based yogurt is between 0 wt % and 0.4 wt %.

Figure 3:
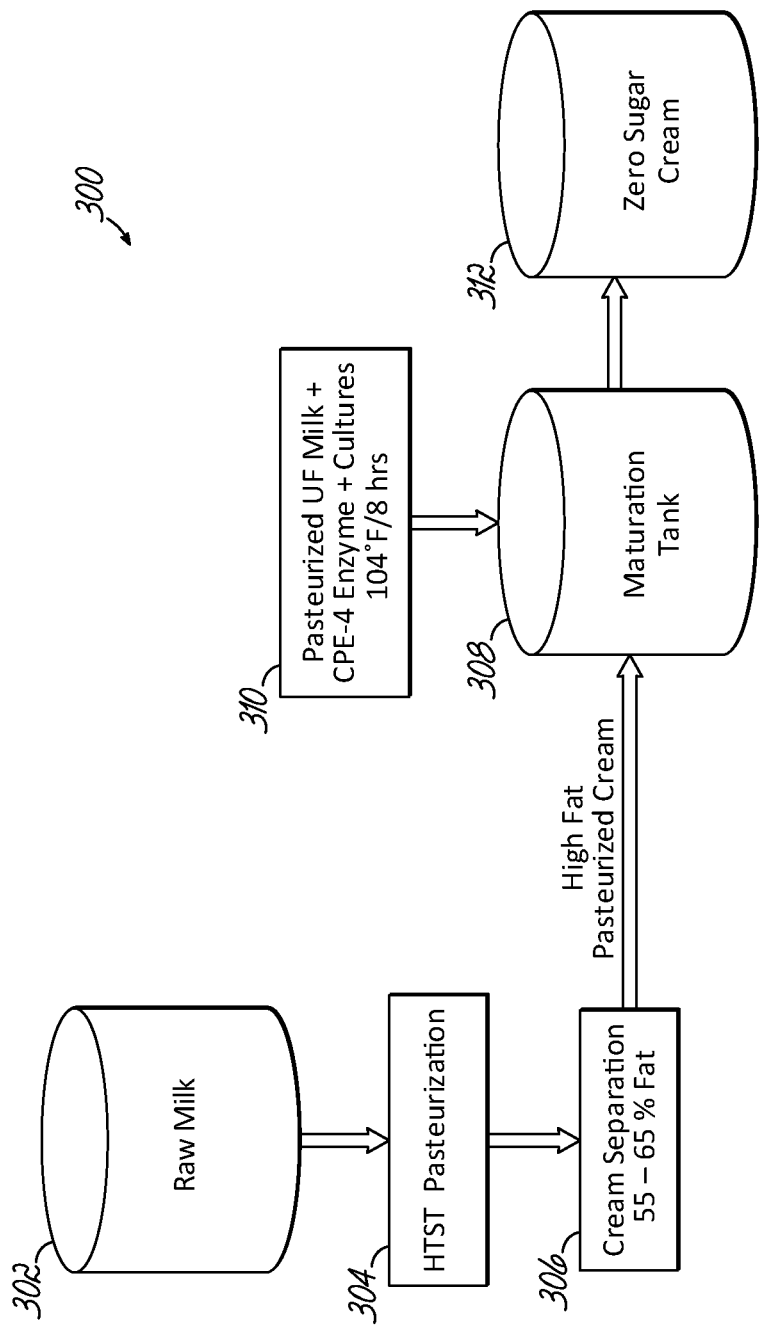
FIG. 3 shows a flow chart for a method of manufacturing a dairy-based food product.

FIG. 3 shows a flow chart for a method 300 of manufacturing a dairy-based food product. In an example, the dairy-based food product is a zero sugar cream product. As shown in FIG. 3, in step 302, raw milk is supplied to a pasteurization process, shown in step 304. The pasteurization process includes heating the raw milk to at least 161° F. for no less than 15 seconds. The heating of the raw milk is followed by rapid cooling. In some embodiments, the raw milk is heated to at least 190° F. and maintained at a temperature of at least 190° F. for a time between 5 and 10 minutes. Pasteurizing the raw milk at a temperature of at least 190° F. for a time between 5 and 10 minutes encourages denaturization of whey proteins included in the raw milk, and encourages the denatured whey to adhere to casein protein included in the raw milk. This process increases the yield and improves texture of dairy-based food products.

In step 306, the pasteurized milk is separated into a skim portion and a cream portion. The cream portion includes between about 55% and 65% fat. In step 306, the cream portion is fed into a maturation tank. In an embodiment, in step 310, an amount of the permeate portion of the ultra-filtered skim described above is added to maturation tank with the cream portion. Also in step 308, in addition, CPE-4, and an amount of Milk 2.0 is added to the maturation tank. The mixture of these components is allowed to mature at about 104° F. for about 8 hours, shown in 308, producing the zero sugar cream product in step 312. Particularly, the zero sugar cream product has significantly low amounts of carbohydrates, and in some examples, the amount of carbohydrates in zero sugar cream product is between 0 wt % and 0.4 wt %.

Figure 4:
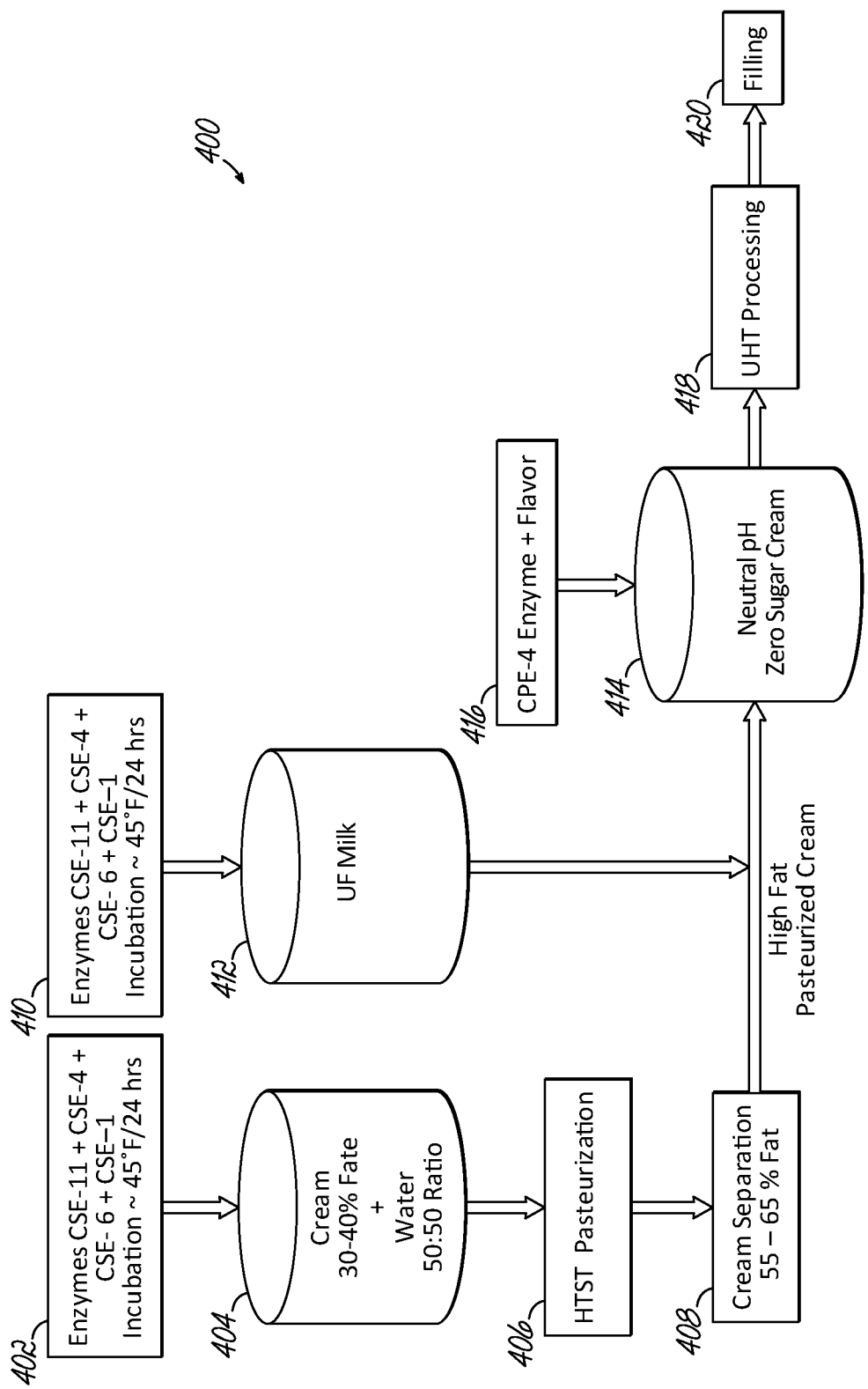
FIG. 4 shows a flow chart for a method of manufacturing a dairy-based food product.

FIG. 4 shows a flow chart for a method 400 of manufacturing a dairy-based food product. In an example, the dairy-based food product is a zero sugar cream. In step 402, CSE-11, CSE-4, CSE-6, and CSE-1 are added to a mixture of cream including and water. The mixture includes 30-40% fat and the water is present in a ratio of 50:50 by weight of water to fat. In step 403, the mixture is allowed to incubate at about 45° F. for about 24 hours. In step 404, the mixture is pasteurized and separated into a cream portion, shown in step 406, and a skim portion, which is not shown. The pasteurization process includes heating the raw milk to at least 161° F. for no less than 15 seconds. The heating of the raw milk is followed by rapid cooling. In some embodiments, the raw milk is heated to at least 190° F. and maintained at a temperature of at least 190° F. for a time between 5 and 10 minutes. Pasteurizing the raw milk at a temperature of at least 190° F. for a time between 5 and 10 minutes encourages denaturization of whey proteins included in the raw milk, and encourages the denatured whey to adhere to casein protein included in the raw milk. This process increases the yield and improves texture of dairy-based food products. The cream portion includes fat in an amount of about 55%-65% by weight. In step 410, CSE-11, CSE-4, CSE-6, and CSE-1 are added to an amount of the permeate portion of the ultra-filtered skim described above and allowed to incubate at about 45° F. for about 24 hours. In step 412, the ultra-filtered skim permeate with the added enzymes, such as CPE-4, is added to the cream portion, in step 416, to form a pasteurized cream mixture, and mixed in step 414. Additional ingredients are added to the pasteurized cream mixture to form a zero sugar cream blend. Optionally, additional ingredients may be added to the dairy-based food product. The additional ingredients may include flavorings (artificial or natural), probiotics, oils such as medium chain triglyceride (MCT) oil which contain two or three fatty acids, canola oil, and mixtures thereof, gellan gum, and vitamins such as Vitamin A, Vitamin D, Vitamin E, Vitamin K, Vitamin C and Vitamin B1, B2, B3, B5, B6, B7, B9, B12, and mixtures thereof, to form the zero sugar cream blend. In some examples, the MCT oil includes triglycerides having one or more carbon chains including between 3 and 13 carbon atoms. The zero sugar cream blend has a neutral pH of about 6.5-7.1. In step 418, the zero sugar cream blend is subjected to an ultra-high temperature process. In the ultra-high temperature process, the temperature of the zero sugar cream blend is increased to between about 285° F. and 295° F. for 3-10 seconds. After the zero sugar cream blend is treated to the ultra-high temperature process, the dairy-based food product is formed, in step 420. Particularly, the dairy-based food product has significantly low amounts of sugar, and in some examples, the sugar content in the dairy-based food product is between 0 wt % and 0.4 wt %.

A zero sugar dairy-based food product is also provided. The zero sugar dairy-based food product includes enzymes therein. Particularly, the zero sugar dairy-based food product includes a protease, an acyl transferase, and a lactase. Furthermore the zero sugar dairy-based food product includes milk, or a sub-portion of raw milk, such as skim milk or cream. In an embodiment, the zero sugar dairy-based food product includes skim milk. Furthermore, the zero sugar dairy-based food product at least one of an additional ingredient selected from a group consisting of a probiotic, an artificial flavoring, a natural flavoring, a cream, a vitamin, a pectin, an oil, and combinations thereof. Alternatively or in addition, the zero sugar dairy-based food product includes additional ingredients which may be flavorings (artificial or natural), probiotics, oils such as medium chain triglyceride (MCT) oil which contain two or three fatty acids, canola oil, and mixtures thereof, gellan gum, and vitamins such as Vitamin A, Vitamin D, Vitamin E, Vitamin K, Vitamin C and Vitamin B1, B2, B3, B5, B6, B7, B9, B12, and mixtures thereof. In some examples, the MCT oil includes triglycerides having one or more carbon chains including between 3 and 13 carbon atoms. The zero sugar dairy-based food product also includes an amount of water. The zero sugar dairy-based food product also has a sugar content of between 0 wt % and 0.4 wt %.

Alternatively or in addition, the zero sugar dairy-based food product may include fruits—pureed, extracts, or concentrates—and/or a blend of vitamins and minerals, including Vitamins A, C, D, E, K, B1 (thiamine), B2 (riboflavin), B3 (niacin), B5 (pantothenic acid), B6, B7 (biotin), B12 (cyanocobalamin), B9 (folic acid and B9), choline, carnitine and calcium, phosphorus, sodium, potassium, magnesium, manganese, sulfur, chloride, iron, iodine, fluoride, zinc, copper, selenium, chromium, cobalt, and combinations thereof.

Each of the features described herein may be included in any combination in a single embodiment. Similarly, each of these features may be individually included in an embodiment of the invention. The features described herein are not to be construed as to be limiting the scope of the invention, but are included to illustrate particular ranges of features that may be included in the zero sugar dairy-based food product.

In an embodiment, the zero sugar dairy-based food product includes the protease in an amount of between 0.00015 wt % and 0.0003 wt % of the dairy-based food product. In an embodiment, the zero sugar dairy-based food product includes the acyl transferase in an amount of between 0.001 wt % and 0.002 wt % of the dairy-based food product. In an embodiment, the zero sugar dairy-based food product includes the lactase in an amount of between 0.2 wt % and 0.4 wt % of the dairy-based food product. In an embodiment, the zero sugar dairy-based food product includes the skim milk in an amount of between 57 wt % and 62 wt % of the dairy-based food product. In an embodiment, the zero sugar dairy-based food product includes the oil in an amount of between 1.2 wt % and 2 wt % of the dairy-based food product. In an embodiment, the zero sugar dairy-based food product includes the cream in an amount of between 0.4 wt % and 0.8 wt % of the dairy-based food product. The natural flavoring derives its aroma or flavor compounds from plant or animal sources. These plant or animal sources may include fruit, meat, fish, spices, herbs, roots, leaves, buds, bark, or combinations thereof. The plant and animal sources are distilled, fermented, or otherwise manipulated in a lab to extract the flavors included therein, which may then be added to the zero sugar diary-based food product. The natural flavors are non-nutritive. In an embodiment, the zero sugar dairy-based food product includes the natural flavoring in an amount of between 28 wt % and 32 wt % of the dairy-based food product. In an embodiment, the zero sugar dairy-based food product includes the pectin in an amount of between 0.12 wt % and 0.18 wt % of the dairy-based food product. In an embodiment, the zero sugar dairy-based food product includes the water in an amount of between 6 wt % and 8 wt % of the dairy-based food product. In an embodiment, the zero sugar dairy-based food product includes the skim milk comprises a protein in an amount of between 7.5 wt % and 12.5 wt % of the skim milk.

EXAMPLES

In an embodiment, the diary-based shake includes the formulation shown in Table 1. The values in the "Low" and "High" columns refer to weight percentages:

TABLE 1

Example Dairy-based Shake Formulation
Dairy-based Shake

| Ingredients | Low | High |
| --- | --- | --- |
| CSE-11 (Enzyme) | 0.4 | 0.2 |
| CPE-1 (Enzyme) | 0.0003 | 0.00015 |
| CPE-4 (Enzyme) | 0.002 | 0.001 |
| Ultra-Filtered Milk (12.5% protein) | 62 | 57 |
| Water | 6 | 8 |
| Canola Oil | 2 | 1.2 |
| Lactose Free Cream | 0.8 | 0.4 |
| Mango Prep | 28 | 32 |
| Vitamin Blend | 1 | 1.5 |
| Pectin | 0.12 | 0.18 |
| TOTAL | 100 | 100 |

In an embodiment, the diary-based yogurt includes the formulation shown in Table 2. The values in the "Low" and "High" columns refer to weight percentages:

TABLE 2

Example Dairy-based Yogurt Formulation
Dairy-based Yogurt

| Ingredients | Low | High |
| --- | --- | --- |
| CPE-4 (Enzyme) | 0.00005 | 0.0001 |
| Ultrafiltered Milk (7.5% protein) | 84 | 78 |
| Pasteurized skim milk | 8 | 10 |
| CCE-1 (Enzyme) | 0.001 | 0.0015 |
| CZC-1 (Enzyme) | 0.00015 | 0.0003 |
| CCE-2 (Enzyme) | 0.002 | 0.004 |
| CCE-3 (Enzyme) | 0.0005 | 0.0015 |
| CCE-4 (Enzyme) | 0.002 | 0.006 |
| Culture | 0.002 | 0.004 |
| Fruit Prep | 8 | 12 |
| TOTAL | 100 | 100 |

As used herein, "Fruit prep" includes the formulation shown in Table 3. The values in the "Low" and "High" columns refer to weight percentages:

TABLE 3

Fruit Prep Formulation
Fruit Prep

| Ingredients | Low | High |
| --- | --- | --- |
| Water | 59 | 55 |
| Inulin | 34 | 37 |
| Natural Flavor (WONF) | 4.6 | 5 |
| Pectin | 1.2 | 1.6 |

TABLE 3-continued

Fruit Prep Formulation
Fruit Prep

| Ingredients | Low | High |
|---|---|---|
| Vegetable Juice for Color | 0.63 | 0.67 |
| Locust Bean Gum | 0.34 | 0.38 |
| Monk Fruit Extract | 0.26 | 0.3 |
| Lemon Juice Concentrate | 0.18 | 0.22 |
| Calcium Lactate | 0.09 | 0.13 |
| Steviol Glycosides | 0.034 | 0.038 |
| Sodium Lactate | 0.028 | 0.032 |
| Total | 100 | 100 |

While the present invention has been illustrated by a description of various embodiments and while these embodiments have been described in considerable detail, it is not the intention of the applicant to restrict or in any way limit the scope of the appended claims to such detail. By way of example, the methods and products discussed herein additionally or alternatively may be used to produce a zero sugar dairy-based food product or describe a zero sugar dairy-based food product itself. The methods may be used to produce dairy-based beverages, snack items, yogurts, and/or additional or similar products. The health advantages of consumer sugar free products or products essentially free of sugar, such as those described herein, are myriad, and may contribute to a healthier lifestyle. Additional advantages and modifications will readily appear to those skilled in the art. Thus, the invention in its broader aspects is therefore not limited to the specific details, representative apparatus, method, product, or illustrative example shown and described. Accordingly, departures may be made from such details without departing from the spirit or scope of applicant's general inventive concept.

What is claimed is:

1. A method of making a zero sugar dairy-based food product, the method comprising:
    adding an enzyme blend comprising a lactose oxidase and a beta galactosidase to an amount of raw milk to form an amount of enzyme treated milk;
    separating the enzyme treated milk into a skim portion and a cream portion;
    pasteurizing the skim portion to form a pasteurized skim portion;
    adding water to the pasteurized skim portion to form a pasteurized skim portion with added water;
    filtering the pasteurized skim portion with added water by ultrafiltration forming a permeate portion and a retentate portion;
    adding an additional ingredient selected from a group consisting of a probiotic, an artificial flavoring, a natural flavoring, an amount of the cream portion, a vitamin, a pectin, an oil, and combinations thereof, to the retentate portion forming a retentate portion with added ingredients; and
    heating the retentate portion with added ingredients to a temperature between 285° F. and 295° F. for a preselected amount of time forming the zero sugar dairy-based food product, wherein the dairy-based food product comprises a sugar content of between 0 wt % and 0.4 wt % and the beta galactosidase is added in an amount sufficient to have between 0.2 wt % and 0.4 wt % beta galactosidase included in the dairy-based food product.

2. The method of claim 1, wherein the skim portion comprises between 2.5 wt % and 3.5 wt % lactose.

3. The method of claim 1, wherein the retentate comprises carbohydrates between 0.35 wt % and 0.45 wt % of the retentate.

4. The method of claim 1, wherein the preselected amount of time is between 3 seconds and 10 seconds.

5. The method of claim 1, further comprising pasteurizing the cream portion.

6. The method of claim 1, wherein the ultrafiltered retentate comprises lactose in an amount between 0.7 wt % and 1.3 wt %.

7. The method of claim 1, further comprising adding bacterial cultures to the retentate and fermenting the retentate.

* * * * *